Patented Sept. 26, 1933

1,927,903

UNITED STATES PATENT OFFICE 1,927,903

CONTROL SYSTEM

Walter Schaelchlin, Wilkinsburg, Pa., assignor to Westinghouse Electric & Manufacturing Company, a corporation of Pennsylvania Application December 1, 1931. Serial No. 578,304

11 Claims. (Cl. 172—8)

My invention relates, generally, to control systems and more particularly to control systems that may be utilized for operating ship propulsion motors.

An object of my invention is the provision of a control system of the class indicated that shall be simple and reliable in operation and be economically manufactured and installed.

Another object of my invention is to provide means for operating a synchronous motor from an alternating current generator and means for so energizing the field windings of the motor and the generator as to maintain the current delivered to, and the voltage impressed upon, the motor substantially in phase with each other for all speeds and load conditions of the motor.

A further object of my invention is to provide means for selectively connecting any one, or all, of a plurality of motors in circuit relation with any one, or all, of a plurality of generators and means for so interlocking the selective means as to prevent the operator from improperly connecting the motors and the generators in circuit relation.

A still further object of my invention is to provide means for selectively connecting any one, or all, of a plurality of synchronous motors in circuit relation with any one, or all, of a plurality of alternating current generators and means for so energizing the selected field windings as to maintain the current delivered to, and the voltage impressed upon, the selected motor or motors, as the case may be, substantially in phase with each other for all speeds and load conditions.

A still further object of my invention is to provide means for selectively connecting any one, or all, of a plurality of synchronous motors in circuit relation with any one, or all, of a plurality of generators and means for so energizing such of the field windings that meet the requirements that may be called for by the motor-generator selective means, together with interlocking means for insuring that the motor-generator selective circuits are completely effected before the said field windings can be energized.

Another object of my invention is to provide means for selectively connecting any number of a plurality of motors in circuit relation with any number of a plurality of alternating current generators and means for insuring that the speed of the selected generator or generators, as the case may be, is less than a predetermined low value while the motor-generator selective means is being operated.

Other objects and a fuller understanding of the invention may be had by referring to the following description taken in connection with the accompanying drawings, in which.

Figure 1:
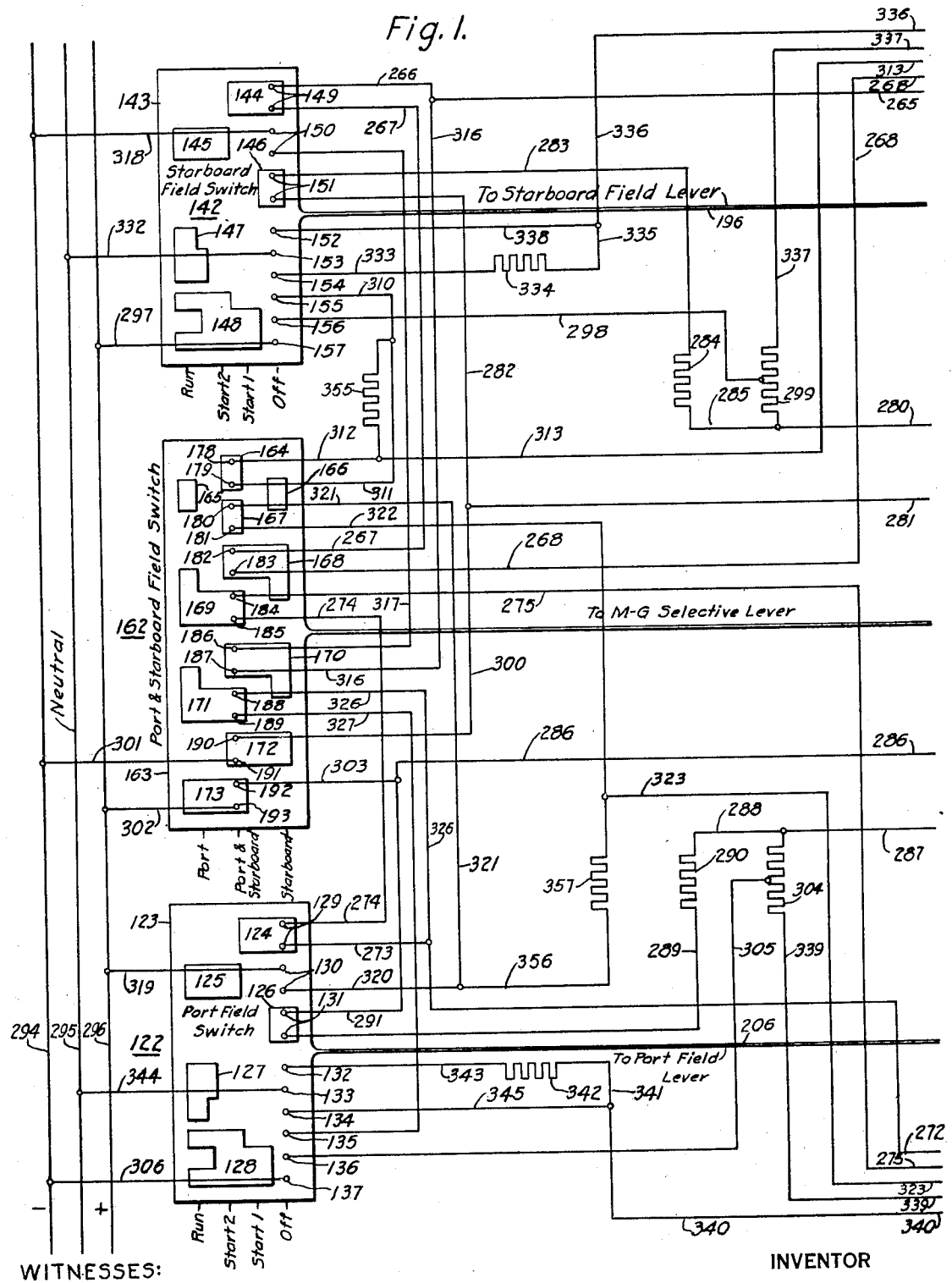
Figure 1 is a diagrammatic view of the left-hand part only of the complete control system, illustrating mainly the field control switches.
Figure 2:
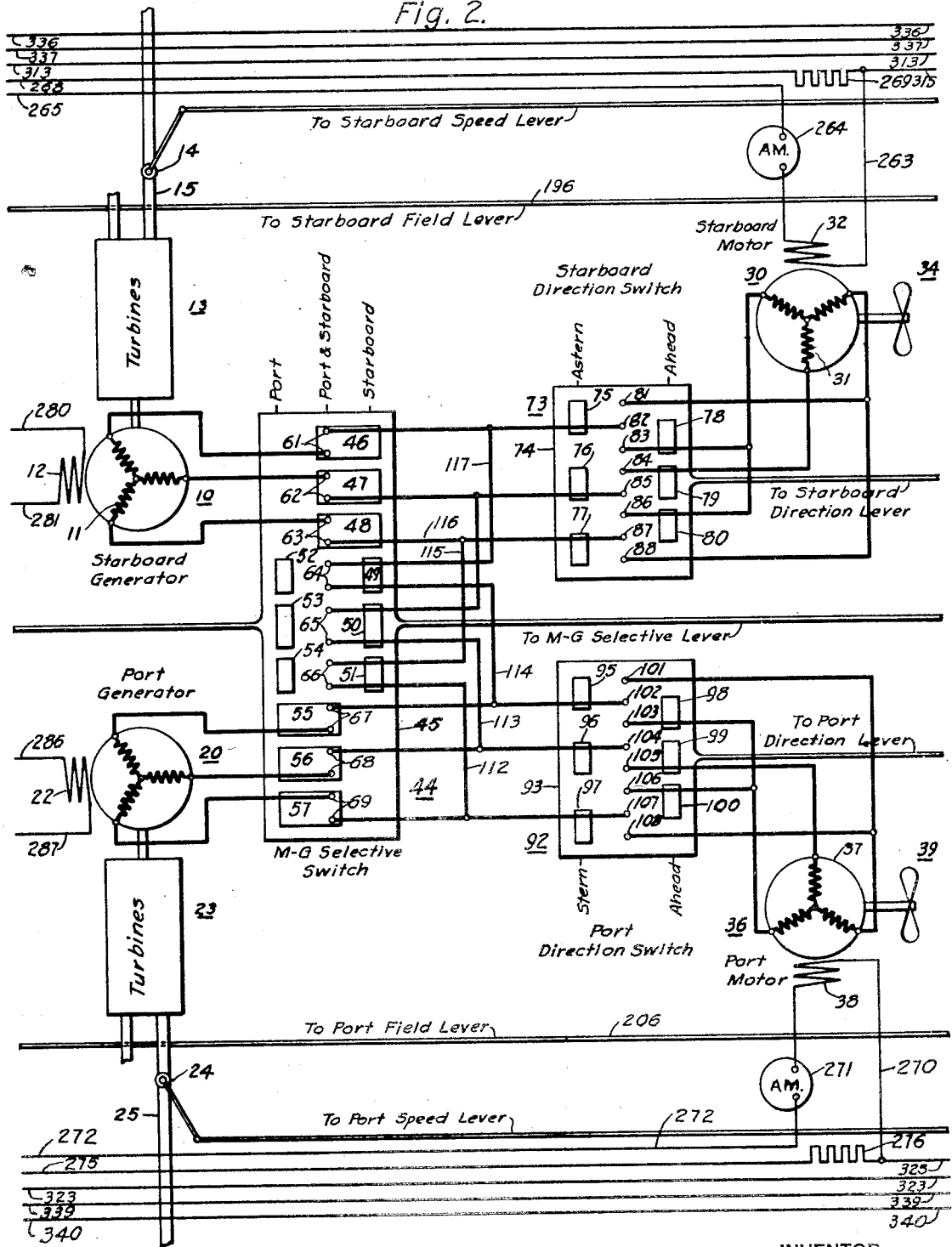
Fig. 2 is a diagrammatic view of the middle part only of the complete control system, illustrating mainly the motors and generators, together with the direction and the motor-generator selective switches.
Figure 3:
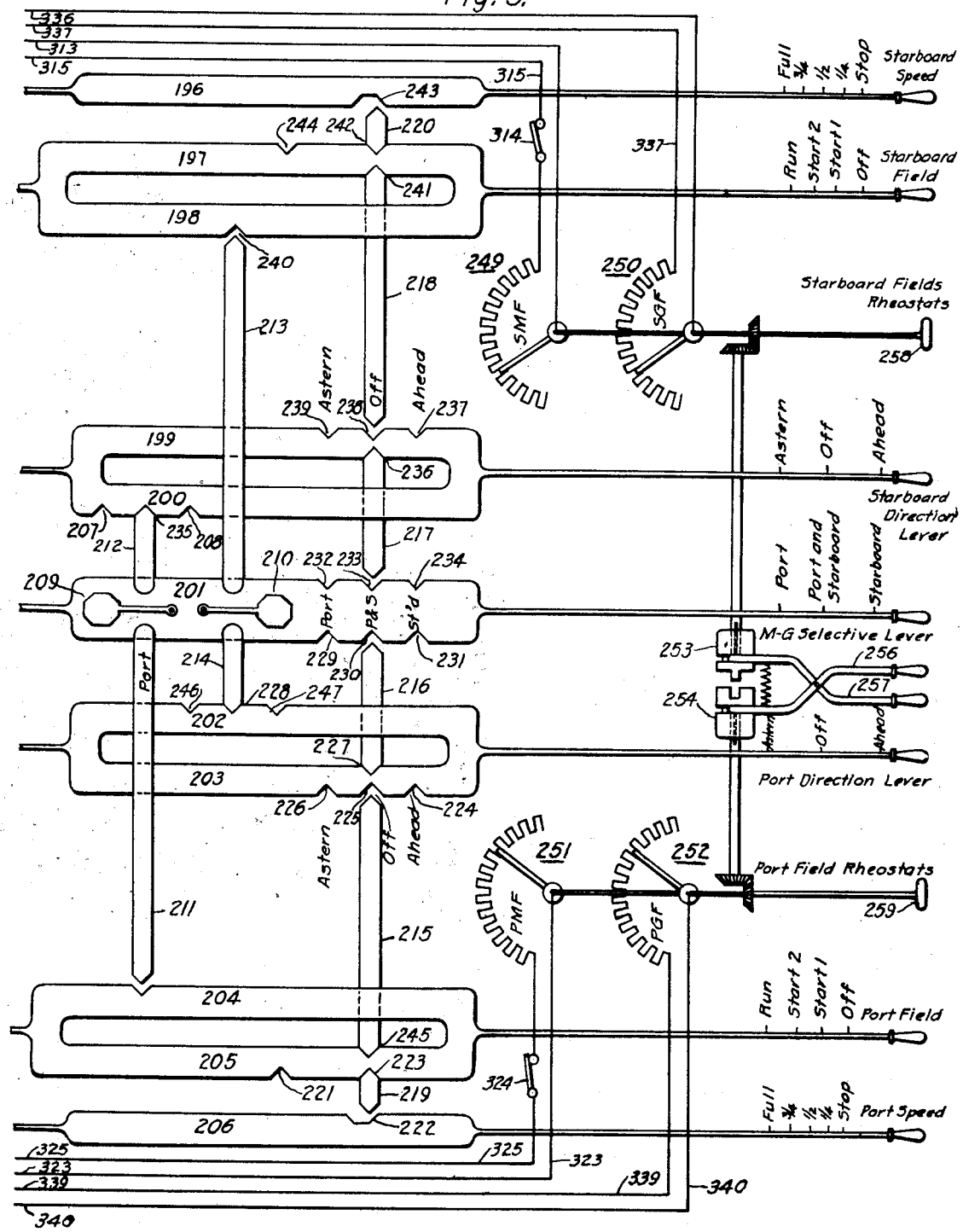
Fig. 3 is a diagrammatic view of the right-hand part only of the complete control system, illustrating mainly the field rheostats and the mechanical interlocking system.

When considering the control system, that part designated as Fig. 2 should be placed and aligned between the parts designated as Figs. 1 and 3, making the Figs. 1, 2 and 3 reading from left to right, and, thus, giving the appearance as one complete drawing for the entire control system.

With reference to the drawings, my invention comprises, generally, two alternating current generators 10 and 20 driven respectively by the turbines 13 and 23, two synchronous motors 30 and 36 arranged to drive the screw propellers 34 and 39, respectively, a motor-generator selective switch 44, two direction switches 73 and 92 for reversing the direction of rotation of the motors, three field switches 122, 143 and 162 for selectively energizing the generator field windings 12 and 22 and the motor field windings 32 and 38, two manually operated generator field rheostats 250 and 252, two manually operated motor field rheostats 249 and 251, and a mechanically interlocking system for insuring that the proper circuit connections are effected.

The turbines 13 and 23 may be of any well known construction, but in the present invention, since the motors 30 and 36 are of the synchronous type, the turbines are of the variable speed type so that the speed and the frequency of the generators may be varied for regulating the speed of the motors. As illustrated, the admission of the live steam through the intake pipe 15 into the turbine 13 is controlled by the throttle valve 14. The throttle, in turn, is directly connected through means of a part of the mechanical interlock to the starboard speed lever. Similarly, the admission of the live steam through the intake pipe 25 is controlled by the throttle valve 24. This throttle valve, in turn, is directly connected through a part of the mechanical interlock to the port speed lever, shown on the right edge of the drawings in Fig. 3.

In the interest of clarity, the generator 10 and the motor 30 will, hereinafter, be referred to as the starboard generator and starboard motor, respectively, and the generator 20 and the motor 36 will, hereinafter, be referred to as the port generator and the port motor, respectively.

For the purpose of providing a number of different connections between the motors and the generators, I employ a motor-generator selective switch 44, a starboard direction switch 73, and a port direction switch 92. The motor-generator selective switch 44 comprises a slidably mounted base 45 upon which are properly arranged a plurality of contact segments 46 to 57, inclusive, together with a plurality of aligned sets of contact fingers 61 to 69, inclusive. The slidably mounted base is directly connected through a part of the mechanical interlock to the motor-generator selective lever. The starboard direction switch 73 and the port direction switch 92 are similar in construction.

The starboard direction switch 73 comprises a slidably mounted base 74 upon which are properly arranged a plurality of contact segments 75 to 80, inclusive, together with a plurality of aligned contact fingers 81 to 88, inclusive. The starboard direction switch 73 is directly connected through a part of the mechanical interlock to the starboard direction lever.

The port direction switch 92 comprises a slidably mounted base 93 upon which are properly arranged a plurality of contact segments 95 to 100, inclusive, together with a plurality of aligned contact fingers 101 to 108. The port direction switch 92 is directly connected through a part of the mechanical interlock to the port direction lever.

As is apparent, a number of different operating conditions are satisfied by the combined operation of the motor-generator selective switch 44 and the port and the starboard direction switches. When the operating conditions call for maximum speed, which represents, in the case of a screw propeller, the maximum load condition, the starboard motor and the port motor are individually and directly connected to the starboard generator and the port generator, respectively. In order to effect this circuit arrangement, the motor-generator selective switch 44 is actuated to the central position, which will be designated, hereinafter, as the "port-and-starboard" position, and which is the position indicated in the drawings. As illustrated, the rotation of the synchronous motor 30 and the synchronous motor 36 are controlled, respectively, by the starboard direction switch 73 and the port direction switch 92. When the operating conditions call for forward movements, the starboard and port direction switches are actuated to the "ahead" position, and when the operating conditions call for backward movements, the starboard and the port direction switches are operated to the "astern" position. Also, the motors may be disconnected from the generators when the starboard and the port direction switches are actuated to their "neutral" position.

From approximately 75% of the maximum speed to minimum speed, which correspondingly represents approximately one-half load to minimum load, as the load varies as the cube of the speed of the propeller shaft, the most efficient circuit arrangement is to operate both of the motors from either one of the two generators. By this arrangement, one of the turbines and its corresponding generator may be shut down, while the other turbine and its corresponding generator provides electric power for the two motors. As is apparent, when the load on each motor is less than 50% of the capacity of its corresponding generator, such an arrangement provides a much more efficient drive than by operating each motor separately from its corresponding generator. If, for illustration, the operator desires to connect both motors in circuit relation with the starboard generator, this may be done by actuating the base 45 of the motor-generator selective switch 44 to the left, thus causing the contact fingers to align with "starboard" position. In this position, as will be observed, the set of contact fingers 67, 68 and 69 no longer engage the contact segments 55, 56 and 57, with the result that the port generator 20 is disconnected from the port motor 36.

Just as soon as the port generator is disconnected, a governor (not shown) that is responsive to the load condition, immediately causes the speed of the turbine 23 to decrease to a relatively low value. However, if the operating conditions are such that the port generator is not likely to be needed within a reasonable length of time, the operator may completely shut down the turbine by operating the usual control valves, (not shown).

When the motor-generator selective switch 44 is in the "starboard" position, the current upon leaving the starboard generator, flows through the set of contact fingers 61, 62, and 63 bridged by the contact segments 46, 47, and 48; and thence to the motors in parallel, substantially half of the current flowing directly to the starboard motor 30 through the starboard direction switch 73, and the remaining half of the current flowing through the transversely disposed conductors 115, 116, and 117, the set of contact fingers 64, 65 and 66 bridged by the contact segments 49, 50 and 51, the transversely disposed conductors 112, 113, and 114, and the port direction switch 92 to the port motor 36.

On the other hand, when the operator desires to operate both of the motors from the port generator, this may be done by actuating the motor-generator selective switch 44 to the "port" position. In the "port" position, the set of contact fingers 61, 62 and 63 no longer engage the contact segments 46, 47 and 48, with the result that the starboard generator is disconnected from the starboard motor. As soon as the starboard generator is disconnected, a governor (not shown) that is responsive to the load condition immediately causes the speed of the turbine 13 to decrease to a relatively low value. Also, if the operating conditions are such that the starboard generator will not be needed for a reasonable length of time, the operator may completely shut down the turbine 13 by operating the usual control valves (not shown). When the motor-generator selective switch 44 is in the "port" position the current, upon leaving the port generator flows through the set of contact fingers 67, 68 and 69 bridged by the contact segments 55, 56, and 57, and thence to motors in parallel, substantially half of the current flowing directly to the port motor 36 through the port direction switch 92, and the remaining half of the current flowing through the transversely disposed conductors 112, 114 and 113, the set of contact fingers 64, 65 and 66 bridged by the contact segments 52, 53, 54, the transversely disposed conductors 115, 116, 117 and the starboard direction switch 73 to the starboard motor 30.

Also, by the combination of the motor-generator selective switch and the two direction switches, the starboard motor 30 only may be connected in circuit with the port generator 20 only, and the port motor 36 only may be connected in circuit with the starboard generator 10 only. The starboard motor 30 may be connected in circuit relation with the port generator 20 only, by actuating the motor-generator selective switch 44 to the "port" position, the starboard direction switch 73 to either the "ahead" or "astern" position, and the "port" direction switch 92 to the "neutral" position, being the position indicated in the drawings. Conversely, the port motor 36 only may be connected in circuit relation with the starboard generator 10 only by actuating the motor-generator selective switch 44 to the "starboard" position, the port direction switch 92 to either the "ahead" or "astern" position and the "starboard direction" switch 73 to the "neutral" position, being the position indicated in the drawings.

By such a switching arrangement, either one of the two motors may be separately operated in circuit relation with either one of the two generators, or both of the motors may be operated from either one of the two generators. This provides a very flexible arrangement so that repairs may be made upon either one of the two motors, or either one of the two generators while the other two are driving the vessel.

For the purpose of energizing the generator fields 12 and 22, and the motor fields 32 and 38 in accordance with the motor-generator requirements, as determined by the position of the motor-generator selective switch 44, I employ three field switches 122, 142 and 162, which will, hereinafter, be referred to as the port field switch, the starboard field switch, and the port-and-starboard field switch, respectively. The port field switch 122 comprises, generally, a slidably mounted base 123 upon which are properly arranged a plurality of contact segments 124 to 128, inclusive, and a plurality of sets of aligned contacts 129, 130 and 131, and a plurality of individual aligned contacts 132 to 137, inclusive. The slidably mounted base 123 is directly connected through a part of the mechanical interlock to the port field lever, shown on the right edge of the drawings in Fig. 3.

The starboard field switch 142 is similar in construction to the port field switch 122, and comprises a slidably mounted base 143 upon which are properly arranged a plurality of contact segments 144 to 148, inclusive, a plurality of sets of aligned contact fingers 149, 150 and 151, and a plurality of individual aligned contact fingers 152 to 157, inclusive. The slidably mounted base 143 is directly connected through a part of the mechanical interlock to the starboard field lever, shown on the righthand edge of the drawings in Fig. 3.

As indicated in the drawings, the port field switch 122 and the starboard field switch 142 may be progressively actuated to any one of four positions, namely "off", "start I", "start II" and "run" positions.

The port-and-starboard field switch 162 is similar in construction to the port field switch and the starboard field switch, and comprises a slidably mounted base 163 upon which are properly arranged a plurality of contact segments 164 to 173, inclusive, and a plurality of aligned contact fingers 178 to 193, inclusive. As indicated on the drawings, the port-and-starboard field switch 162 may be actuated to either one of three positions, namely "port", "starboard", and "port-and-starboard".

The port-and-starboard field switch 162 is directly connected to the motor-generator selective switch 44, so that the positions of the port-and-starboard field switch corresponds to the similar positions of the motor-generator selective switch. That is to say, when the motor-generator selective switch 44 is actuated to the "port-and-starboard" position, separately connecting the starboard motor in circuit with the starboard generator, and the port motor in circuit with the port generator, the port-and-starboard field switch 162 is actuated to the corresponding "port-and-starboard" position, establishing circuits such that the starboard motor and generator fields are controlled exclusively by the starboard field switch 142, and such that the port motor and generator field windings are controlled exclusively by the port field switch 122. On the other hand, when the motor-generator selective switch 44 is actuated to the "starboard" position, thus connecting both of the motors in circuit relation with the starboard generator only, the port-and-starboard field switch 162 is actuated to the corresponding "port" position, establishing circuits such that the field windings of both the motors and of the starboard generator are controlled exclusively by the starboard field switch 142 and, at the same time, deenergizing the field winding of the port generator, and removing the field control entirely from the port field switch 122.

Conversely, when the motor-generator selective switch is actuated to the "port" position, thus connecting both of the motors in circuit relation with the port generator, the port-and-starboard field switch 162 is actuated to the corresponding "port" position, establishing circuits such that the field windings of both of the motors and of the port generator are controlled exclusively by the port field switch 122 and, at the same time, deenergizing the field winding of starboard generator, and removing the field control entirely from the starboard field switch 142.

Therefore, from the foregoing, it has been seen that the actuation of the motor-generator selective switch 44 and the port-and-starboard field switch 162 as a unit, establishes such field circuits as are necessary to meet the motor-generator requirements, which may be called for by the motor-generator selective switch 44.

As the load upon a motor driving a propeller varies as the cube of the speed of the propeller shaft, the power factor of the line connections between the generator and the motor would, in the absence of the present invention, vary over relatively wide limits. However, in the present invention, I propose to so adjust the field excitation of the motors and the generators that unity power factor prevails in the line connections between the motors and the generators for all speeds and for all load conditions. That is to say, the motor and the field windings are so energized as to maintain the current delivered to, and the voltage impressed upon, the motors substantially in phase with each other for all loads and speeds of the motors.

A synchronous motor is said to be over-or-under-excited according as its excitation is greater or less than normal, normal excitation being that which produces unity power factor. Over-excitation produces a condensive action and causes the motor to take a leading current, and, conversely, an under-excitation produces a reactive action and causes the motor to take a lagging current. The effect produced on a motor by a lagging or a leading current is just opposite to that produced by these currents on a generator, because the armature reaction depends upon the phase relation between the current and the generated voltage. Therefore, in view of the fact that the current of the motor and the current of the generator are nearly opposite in phase with respect to the generated voltage, the effect produced on the field by a leading or a lagging current in a motor is just opposite to the effect produced on the field by similar currents in a generator.

For the purpose of so proportioning the field excitation of the starboard motor with respect to the field excitation of the starboard generator as to maintain the current delivered to, and the voltage impressed upon, the motor substantially in phase, I employ a pair of adjustable rheostats 249 and 250 mechanically connected together by the illustrated shaft. The adjustable rheostat 249 is connected in circuit with the starboard motor field and the rheostat 250 is connected in circuit with the starboard generator field. The rheostats are so calibrated, after the motors and generators are installed, that, by operating the rheostat knob 258, corresponding changes are effected in the excitation of the starboard motor field winding and the starboard generator field winding, with the result that by the combined actions of the motor and the generator, unity power factor prevails in the line connections between the armature of the starboard motor and the armature of the starboard generator for all speeds and loads of the starboard motor.

The construction, calibration, and operation of the adjustable field rheostat 251 and 252 which are, respectively, connected in circuit relation with the port motor field winding and the port generator field winding are the same as that just described for the adjustable rheostats 249 and 250. Therefore, by maintaining unity power factor in the line connections between the motors and generators, the maximum efficiency of the motors and generators is obtained.

It will be observed, however, that, when both motors are operated from either one of the two generators, the power factor of the line connection between the armatures of the selected generator and of the two motors is no longer unity. This is because the total load of the selected generator is now divided between the two motors. Under this condition, assuming that the resistance drop of each motor is substantially negligible, the reactive drop of each motor is substantially half as much as the reactive drop of the selected generator. This means that each of the motors will take a leading current, unless the field excitation of both of the motors is reduced to a point where unity power factor of the line connections is restored. For the purpose of restoring unity power factor in the connections between the armatures of the motors and the armature of the selected generator, the field excitation of each of the motors is decreased by inserting the power factor correction resistors 355 and 357 in circuit with the field winding of the starboard motor and the field winding of the port motor, respectively.

As illustrated, for the purpose of simultaneously operating the adjustable field rheostats 249 and 250 and the adjustable field rheostats 251 and 252, in order to insure that the field excitation of the two motors and of the selected generator are varied together, the two shafts of the rheostats are coupled together by means of two mating flanges 253 and 254 that are slidably mounted upon the adjacent ends of the illustrated transversely disposed shafts, the outer ends of which being interconnected to the rheostat shafts by means of the illustrated beveled gears. The two slidably mounted flanges 253 and 254 are disposed for actuation by means of a pair of pivotally mounted control levers 256 and 257. The levers are pivoted in a scissor-like fashion so that when they are moved towards each other, the flanges are brought into engagement for effecting simultaneous operation of the rheostats when either one of the operating knobs 258 and 259 is turned.

Inasmuch as the operating condition of the greater part of the cruising distance, calls for both the motors and for both the generators, the slidably mounted flanges 253 and 254 are normally biased in the disengaged position by the illustrated spring interposed between the ends of the control levers that are adjacent to the respective flanges.

As illustrated, the motor-generator selective switch 44, the starboard direction switch 73, the port direction switch 92 the port-and-starboard field switch 162, the port field switch 122 the starboard field switch 142 and the two speed levers are all mechanically interlocked so as to prevent the operator making an improper circuit connection. The major purpose of the interlocking system is not only to insure that the field windings are totally deenergized before any circuits can be effected by the motor-generator selective switch 44 and the two direction switches but also to insure that the proper motor-generator connections are effected before the field windings can be energized.

The interlocking system is somewhat diagrammatically illustrated, since the same results may be accomplished in a number of different ways, and comprises a plurality of horizontally disposed, slidably mounted bars 196 to 206, inclusive, and a plurality of transversely disposed, slidably-mounted bars 211 to 220, inclusive. The ends of the transversely disposed, slidably mounted bars are V-shaped and are disposed to engage complementary V-shaped notches of the horizontally disposed bars. In this manner, when any one of the operating levers is actuated in advance of its proper sequence, the associated transversely disposed bar or bars, as the case may be, operate to prevent the further operation of any of the levers unless the improperly operated lever is restored to its correct position.

A separate function of each lever of the interlocking system is as follows:

(1) The motor-generator selective lever cannot be moved unless both the port and the starboard direction levers are in the "off" position, because, in any other position, the lower end of the transversely disposed bar 216 would ride upon the upper surface of the horizontally disposed bar 203 and cause the upper end of the bar 216 to engage any one of the three V-shaped notches 229, 230 or 231, and the upper end of the transversely disposed bar 217 would ride on the under surface of the horizontally disposed bar 199 and cause the lower end of the bar 218 to engage either one of the three V-shaped notches 232, 233 or 234.

(2) Neither the port nor the starboard direction lever can be moved unless the motor-generator selective lever is in one of the three operating positions, namely, "port", "port-and-starboard", or "starboard". If the motor-generator selective lever be not in one of the three operating positions, the upper end of the transversely disposed bar 216 would ride on the under surface of the horizontally disposed bar 201 and cause the lower end of the bar 216 to engage the V-shaped notch 227 of the transversely disposed bar 203, and the lower end of the bar 217 would ride on the upper surface of the horizontally disposed bar 201 and cause the upper end of the bar 217 to engage the V-shaped notch 236 of the horizontally disposed bar 199.

(3) The port direction lever cannot be moved unless the port field lever is in the "off" position, because, if the port field lever be in any other position, the lower end of the transversely disposed bar 215 would ride on the upper surface of the horizontally disposed bar 205 and cause the upper end of the bar 215 to engage any one of the three V-shaped notches 224, 225 or 226.

(4) The starboard direction lever cannot be moved unless the starboard field lever is in the "off" position, because, if the starboard field lever be in any other position, the upper end of the transversely disposed bar 218 would ride on the under surface of the horizontally disposed bar 197 and cause the lower end of the bar 218 to engage any one of the three V-shaped notches 237, 238 or 239.

(5) In addition, the port direction lever cannot be moved if the motor-generator selective lever is in the starboard position and the starboard field lever is out of the "off" position, because, in such positions, the pivotally mounted block 210, carried by the horizontally disposed bar 201, is thrust between the adjacent ends of the transversely disposed bars 213 and 214. Therefore, if the upper end of the transversely disposed bar 213 be riding on the under surface of the horizontally disposed bar 198, the lower end of the transversely disposed bar 214 is positively thrust into engagement with the V-shaped notch 228 of the horizontally disposed bar 202.

(6) In addition, the starboard direction lever cannot be moved if the motor-generator selective lever is in the port position and the port field lever is out of the "off" position, because, in such positions, the pivotally mounted block 209, carried by the horizontally disposed bar 201, is thrust between the adjacent ends of the transversely disposed bars 211 and 212. Therefore, if the lower end of the transversely disposed bar 211 be riding on the upper surface of the horizontally disposed bar 204 the upper end of the transversely disposed bar 212 is positively thrust into engagement with the V-shaped notch 235 of the horizontally disposed bar 200.

(7) The port field lever cannot be moved unless the port direction lever is in either one of the three positions; namely, "astern", "off", or "ahead", because, if the port direction lever be in any other position, the upper end of the transversely disposed bar 215 would ride on the under surface of the horizontally disposed bar 203 and cause the lower end of the bar 215 to positively engage the V-shaped notch 245 of the horizontally disposed lever 205. Also, the port field lever cannot be moved unless the elongated V-shaped slot 222 of the horizontally disposed-bar 206 registers with the lower end of the transversely disposed bar 219.

(8) The starboard field lever cannot be moved unless the starboard direction lever is in either one of the three positions; namely, "astern", "off" or "ahead", because, if the starboard direction lever be in any other position, the lower end of the transversely disposed bar 218 would ride on the upper surface of the horizontally disposed bar 199 and cause the upper end of the bar 218 to positively engage the V-shaped slot 241 of the horizontally disposed lever 197. Also, the starboard field lever cannot be moved unless the elongated V-shaped slots 243 of the horizontally disposed bar 196 registers with the upper end of the transversely disposed bar 220.

(9) The port speed lever can only be moved when the port field lever is in either the "off" or the "run" position. That is, the port speed lever cannot be actuated, except between approximately one-quarter speed and below, unless the upper end of the transversely disposed bar 219 registers with either one of the V-shaped slots 223 or 221 of the horizontally disposed bar 205.

(10) The starboard speed lever can only be moved when the starboard field lever is in either the "off" or the "run" position. That is, the port speed lever cannot be actuated, except between approximately one-quarter speed and below, unless the lower end of the transversely disposed bar 220 registers with the V-shaped slots 242 and 244 of the horizontally disposed bar 197.

The sequence in operating the starboard motor from the starboard generator and the port motor from the port generator is as follows:

At the outset, the pair of field rheostats 249 and 250, and the pair of field rheostats 251 and 252 must be de-clutched, and all of the levers except the motor-generator selective lever which will assume the "port and starboard" position must be restored to their "off" position. In the above-mentioned positions of the levers, since the port field lever and the starboard field lever are in the "off" position, the operator may test the turbines by actuating the port and starboard speed levers. This is usually done to ascertain whether or not the turbines are working properly before operating them under load. However, before any of the other levers can be operated after testing the turbines, it is necessary for the operator to restore the port and the starboard speed levers to a place where the elongated V-shaped slots 222 and 243 register, respectively, with the transversely disposed bars 219 and 220. The movement of the speed levers afforded by the base of the elongated V-shaped notches 222 and 243 allows the operator to throttle the turbines to approximately one-quarter speed and less while the other levers are being actuated. This insures that the electrical connections of the motors and the generators are effected only at relatively low speeds.

After the speed of the turbines are reduced, the next operation is to actuate the port and starboard direction levers to either the "ahead" or the "astern" positions, depending, however, upon which direction the operator wishes the motors to run. This completes the electrical armature connections between the starboard motor and the starboard generator, and between the port motor and the port generator, respectively.

Up to this point, the field windings have not been energized, but before operating the port and starboard field levers for energizing the field windings, it will be well to trace the field circuits when the port and starboard field levers are in the "off" position.

When the port and starboard field levers are in the "off" position, the field windings are closed upon themselves through suitable discharge resistors. The closed circuit for the port motor field winding 38 may be traced from one terminal thereof through the ammeter 271, conductors 272 and 273, the set of contact fingers 129 bridged by the contact segment 124, conductor 274, the contact fingers 185 and 184 bridged by the contact segment 169, conductor 275, the discharge resistor 276 and conductor 270 to the opposite terminal of the field winding 38.

The closed circuit for the starboard motor field winding 32 may be traced from one terminal thereof through the ammeter 264, conductors 265 and 266, the set of contact fingers 149 bridged by the contact segment 144, conductor 267, the contact fingers 182 and 183 bridged by the contact segment 168, conductor 268, the discharge resistor 269, and conductor 263 to the opposite terminal of the field winding 32.

The closed circuit for the port generator field winding 22 may be traced from one terminal thereof through conductors 287 and 288, the field discharge resistor 290, conductor 289, the set of contact fingers 131 bridged by the contact segment 126 and conductors 291 and 286 to the opposite terminal of the field winding 22.

The closed circuit for the starboard field winding 12 may be traced from one terminal thereof through conductors 281 and 282, the set of contact fingers 151 bridged by the contact segment 146, conductor 283, the field discharge resistor 284 and conductors 285 and 280 to the opposite terminal of the field winding 12.

The port field lever and the starboard field lever may be actuated to their "start I" position, because the previous movement of the port direction lever to either the "ahead" or "astern" position allows the transversely disposed bar 215 to move upwardly into engagement with either one of the two V-shaped notches 224 or 226 and because the previous movement of the starboard direction lever to either the "ahead" or "astern" position allows the transversely disposed bar 218 to move downwardly to engagement with either one of the V-shaped notches 237 or 239.

In the "start I" position of the port and the starboard field levers, the motor field windings are still closed circuited, so as to cause the motors to start as straight induction motors, but, for the purpose of supplying a relatively high voltage to meet the demands of the motors when acting as straight induction motors, the generator field windings are energized at 200% excitation. The 200% excitation is effected by connecting the generator field windings across the positive and the negative supply conductors 296 and 294, respectively, whereas for normal excitation the generator field windings are connected either across the positive supply conductor 296 and the neutral supply conductor 295, or across the neutral supply conductor 295 and the negative supply conductor 294.

The circuit for energizing the field winding 22 of the port generator extends from the positive supply conductor 296, through a conductor 302, the contact fingers 193 and 192 bridged by the contact segment 173, conductors 303 and 286, the field winding 22, conductor 287, the upper part of the resistor 304, conductor 305, the contact fingers 136 and 137 bridged by the contact segment 128, and conductor 306 to the negative supply conductor 294.

The circuit for energizing the starboard generator field winding 12 extends from the positive supply conductor 296 through a conductor 297, the contact fingers 157 and 156 bridged by the contact segment 148, conductor 298, the lower part of the resistor 299, conductor 280, the field winding 12, conductors 281 and 300, the contact fingers 190 and 191 bridged by the contact segment 172 and a conductor 301 to the negative supply conductor 294.

At the beginning of the "start I" position, since the speed of the motors is relatively low, the frequency of the current induced in the closed-circuited field windings of the motors is substantially the same as the frequency of the current traversing the armatures of the motors. Under this condition, the pointers of the direct current ammeters 264 and 271 vibrates at a point near the zero reading with a frequency equal to the frequency of the induced current. However, as the frequency of the induced current gradually decreases, the pointers of the ammeters begin to make long periodic swings, indicating that the speed of the motors have attained substantially synchronism. At this point, the operator actuated both the port field lever and the starboard field lever to "start II" position, thus causing the motors to operate as synchronous motors.

In the "start II" position, the 200% excitation of the generator field windings is still maintained, but the motor field windings, which were closed-circuited in the "start I" position, are open-circuited and, at the same time, energized from the positive and the negative supply conductors 296 and 294, respectively. The purpose of maintaining the generator field windings at 200% excitation is to cause the generators to deliver a relatively high voltage for pulling the motors into synchronism.

The circuit for energizing the field winding 38 of the port motor extends from the positive supply conductor 296 through conductor 319, a set of contact fingers 130 bridged by the contact segment 125, conductors 320 and 321, the contact fingers 180 and 181 bridged by the contact segment 167, conductors 322 and 323, the port motor field rheostat 251, the knife switch 324, conductors 325 and 270 the field winding 38, the ammeter 271, conductors 272 and 326, the contact fingers 188 and 189 bridged by the contact segments 171, conductor 327, the contact fingers 135 and 137 bridged by the contact segment 128, and conductor 306 to the negative supply conductor 294.

The circuit for energizing the field winding 32 of the starboard motor may be traced from the positive supply conductor 296 through a conductor 297, contact fingers 157 and 155 bridged by the contact segment 148, conductor 310, the contact fingers 179 and 178, bridged by the contact segment 164, conductors 312 and 313, the starboard motor field rheostat 249, the knife switch 314, conductors 315 and 263, the field winding 32, the ammeter 264, conductors 265 and 316, contact fingers 187 and 186 bridged by the contact segment 170, conductor 317, the set of contact fingers 150 bridged by the contact segment 145, and conductor 318 to the negative supply conductor 294.

When the port and starboard field levers are actuated to the "run" position, the energization of the motor field windings remains the same as it was in the "start II" position, but the excitation of the field windings of the generators is reduced to normalcy. In this position the port generator field winding is connected across the positive supply conductor 296 and the neutral supply conductor 295, and the starboard generator field winding is connected across the neutral supply conductor 295 and the negative supply conductor 294.

During the transition of changing the field windings of the generators from 200% excitation to 100% excitation, provision is made to insure that the generator fields are not open-circuited. This provision with respect to the port generator field winding 22 is accomplished in the following manner:

First, just as soon as the contact segment 127 engages the contact fingers 132 and 133, the neutral supply conductor 295 is connected to the negative supply conductor 294 through a circuit which comprises a conductor 344, the contact fingers 133 and 132 bridged by the contact segment 127, conductor 343, a current limiting resistor 342, conductors 341 and 340, the port generator field rheostat 252, a conductor 339, the lower part of the resistor 304, conductor 305, the contact fingers 136 and 137 bridged by the contact segment 128, and a conductor 306 to the negative supply conductor 294. As will be observed, no harm is caused by momentarily connecting the neutral supply conductor 295 in circuit with the negative supply conductor 294, because the current flow is primarily limited by the current limiting resistor 342, as well as by the resistance of other parts of the circuit.

Second, the negative supply conductor 294 is disconnected from the port generator field winding just as soon as the contact segment 128 is actuated to and beyond the right of the contact finger 136.

Third, the current limiting resistor 342 is excluded from the port generator field winding just as soon as the contact segment 127 engages the contact finger 134.

After the transition is effected, the final field circuit of the port generator extends from the positive supply conductor 296 through a conductor 302, contact fingers 193 and 192 bridged by the contact segment 173, conductors 303 and 286, the field winding 22, a conductor 287, through all of the resistor 304, conductor 339, the port generator field rheostat 252, conductors 340 and 345, contact fingers 134 and 133 bridged by the contact segment 127, and a conductor 344 to the neutral supply conductor 295.

The transition of changing the field winding 12 of the starboard generator from 200% excitation to normalcy is effected in substantially the same manner as that just described with respect to the transition of the port generator field winding 22.

First, just as soon as the contact segment 147 engages the contact fingers 153 and 154, the neutral supply conductor 295 is connected to the negative supply conductor 294 through a circuit which comprises a conductor 332, the contact fingers 153 and 154 bridged by the contact segment 147, conductor 333, a current limiting resistor 334, conductors 335 and 336, the starboard generator field rheostat 250, conductor 337, the upper half of resistor 299, conductor 298, the contact fingers 156 and 157 bridged by the contact segment 148, and a conductor 297 to the positive supply conductor 296. As will be observed, no harm is caused by momentarily connecting the neutral supply conductor 295 in circuit with the positive supply conductor 296, because the current flow is limited by the current limiting resistor 334, as well as by the resistance of other parts of the circuit.

Second, the positive supply conductor 296 is disconnected from starboard generator field winding just as soon as the contact segment 148 is actuated to or beyond the right of the contact finger 156.

Third, the current limiting resistor 334 is excluded from the starboard generator field winding just as soon as the contact segment 147 engages the contact finger 152.

After the transition is effected, the final field circuit of the starboard generator extends from the neutral supply conductor 295, through a conductor 332, the contact fingers 153 and 152 bridged by the contact segment 147, conductors 338 and 336, the starboard generator field rheostat 250, conductor 337, all of the resistor 299, the conductor 280, the field winding 12, conductors 281 and 300, the contact fingers 190 and 191 bridged by the contact segment 172, and a conductor 301 to the negative supply conductor 294.

After the port field lever and the starboard field lever are actuated to the "run" position, the speed of the turbines may be increased to any desired value by operating the port and the starboard field levers.

In the event that the operating conditions call for approximately 75% of full speed, representing approximately one-half load, it is desirable, in the interest of economy, to operate both of the motors from either one of the generators. This change must be effected in the following manner:

First, reduce the speed of the turbines until the elongated V-notches 222 and 243, register with the transversely disposed bars 219 and 220, thus freeing the port field lever and the starboard field lever. Second, the port field lever and the starboard field lever must be restored to their "off" position, deenergizing the field windings of the motors and the generators. When the port field lever and the starboard field lever are restored to their "off" position, the transversely disposed bars 215 and 218 register with their corresponding V-shaped notches 245 and 241. This frees the port and the starboard direction switches and they may now be restored to their "off" position. The restoration of the port and the starboard direction levers to their "off" position, causes the V-shaped notches 227 and 236 to register with the transversely disposed bars 216 and 217. This frees the motor-generator selective lever so that the operator can now operate the motor-generator selective lever to either the "port" or the "starboard" position, depending upon which generator he wants to connect in circuit with the two motors. I will assume that the operator desires to operate both of the motors from the port generator, in which case the motor-generator selective lever is actuated to the port position. In this position, the V-shaped notch 229 registers with the upper end of the transversely disposed bar 216, and the V-shaped notch 232 registers with the lower end of the transversely disposed bar 217. The port and the starboard direction levers may now be operated either to their "astern" or to their "ahead" position, depending upon whether the operating conditions of the vessel call for backward or forward movement. The actuation of the port direction lever to either the "astern" or "ahead" position causes either the V-shaped slot 226 or 224 to register with the upper end of the transversely disposed bar 215. In this position, the transversely disposed bar 215 is free to move upwardly, thus freeing the port field lever.

In addition, when the motor generator selective lever is drawn to the "port" position, the pivotally mounted block 209, carried by the horizontally disposed bar 201 is drawn between the adjacent the lower end of the transversely disposed bar Furthermore, the actuation of the motor-generator selective lever to the port position operates the motor-generator selective switch 44 and the port-and-starboard field switch 162 to their respective "port" positions. As hereinbefore pointed out, when the motor-generator selective switch 44 is in the "port" position, the two motors are connected to the port generator only, thus disconnecting the starboard generator from the system. When the port-and-starboard field switch 162 is actuated to the "port" position, the motor field windings and the port generator field winding are exclusively controlled by the port field switch 122. This means that the starboard field switch 142 no longer has control over the field windings.

For the purpose of simultaneously regulating the excitation of the motor field windings and the port generator field winding, the starboard motor and generator field rheostats 249 and 250 and the port motor and generator field rheostats 251 and 252 are connected together by means of the two flanges 253 and 254, thereby causing the rheostats to operate as a unitary structure. In this manner, they may be controlled by either the knob 258 or the knob 259.

Up to this point, the port is still in the "off" position. In the "off" position the port motor field winding 38 and the port generator field winding 22 are closed-circuited as heretofore traced. The starboard motor field winding 32 is, likewise, closed circuits, but for the purpose of effecting subsequent circuit connections the path of the closed-circuit is now slightly different from that traced hereinbefore. The closed-circuit for the starboard motor field winding 32 may be traced from one terminal thereof through the ammeter 264, conductors 265 and 316, the contact fingers 187 and 188 bridged by the contact segment 171, the conductors 326 and 273, the set of contact fingers 129 bridged by the contact segment 124, conductor 274, the contact fingers 185 and 183 bridged by the contact segment 169, conductor 268, the discharge resistor 269, and a conductor 263 to the opposite terminal of the starboard motor field winding 132.

The next sequence of operation is for the operator to actuate the port field lever to the "start I" position. Just as soon as the port field lever is moved out of the "off" position, the lower end of the transversely disposed bar 211 rides upon the upper surface of the horizontally disposed bar 204. In this position of the bar 211, the upper end of the transversely disposed bar 212 is constrained to engage either the V-shaped slots 207 or 208, depending, however, whether the starboard direction lever is in the "astern" or the "ahead" position, with the result that the starboard direction lever is locked in either one or the other of said positions. Also, just as soon as the port field lever is moved out of the "off" position, the lower end of the transversely disposed bar 215 rides upon the upper surface of the transversely disposed bar 205 and constrains the upper end of the bar 215 to engage either one or the other of the V-shaped slots 226 or 224, depending, however, upon whether the port direction lever is in the "astern" or the "ahead" position. Therefore, the starboard direction lever and the port direction lever are mechanically interlocked just as soon as the port field lever is moved out of the "off" position.

In the "start I" position, the starboard and the port motor field windings are closed circuited, causing the motors to operate as straight induction motors, and the port generator field winding 22 is connected across the positive and negative supply conductors 296 and 294, respectively, thereby energizing the port generator field winding at 200% excitation for delivering a relatively high voltage demanded by the two motors when operating as straight induction motors. The circuit for energizing the port generator field winding 22 is the same as that hereinbefore traced when the port generator was delivering current to the port motor only.

After the motors have attained substantially synchronous speed, as observed by the periodic long strokes of the direct current ammeter 264 and 271, the operator may actuate the port field lever to the "start II" position.

In the "start II" position, the closed-circuited motor field windings are interrupted, and, at the same time, the said field windings are connected in circuit with the positive and the negative supply conductors 296 and 294, respectively. Also, in the "start II" position, for the purpose of causing the port generator to deliver a relatively high voltage for pulling the motors in synchronism, the excitation of the port generator field winding 22 is still maintained at 200%. When the motor field windings are energized, they are caused to operate as synchronous motors instead of straight induction motors.

The circuit for energizing the port motor field winding may be traced from the positive supply conductor 296 through a conductor 319, a set of contact fingers 130 bridged by the contact segment 125, conductors 320 and 356, a power factor correction resistor 357, conductor 323, the port motor field rheostat 251, a knife switch 324, conductors 325 and 270, the port motor field winding 38, the ammeter 271, conductors 272 and 326, the contact fingers 188 and 189 bridged by the contact segment 171, conductor 327, the contact fingers 135 and 137 bridged by the contact segment 128, and a conductor 306 to the negative supply conductor 294.

The circuit for energizing the starboard motor field winding may be traced from the positive supply conductor 296 through a conductor 319, the set of contact fingers 130 bridged by the contact segment 125, conductors 320 and 321, contact fingers 180 and 179 bridged by the contact segment 165, conductor 311, the power factor correction resistor 355, conductor 313, the starboard motor field winding 249, the knife switch 314, conductors 315 and 263, the starboard motor field winding 32, the ammeter 264, conductors 265 and 316, the contact fingers 187 and 189 bridged by the contact segment 171, conductor 327, the contact fingers 135 and 137 bridged by the contact segment 128, and a conductor 306 to the negative supply conductor 294.

As has been observed from the above-traced motor field circuits, the power factor correction resistor 357 is connected in circuit with the port motor field winding 38 and the power factor correction resistor 355 is connected in circuit with the starboard motor field winding 32. The purpose of these power factor correction resistors 355 and 357 is to properly decrease the excitation of the motors when they are both operating from the port generator. A proper decrease in the excitation of the motor field windings prevents the motors from drawing a leading current from the port generator as they would do, because their reactive drop has decreased on the account of less armature current. In this manner, the current delivered to, and the voltage impressed upon, the motors are maintained substantially in phase with each other. As a result the two motors and the port generator are operated at their maximum efficiency.

As the port field lever is actuated from the "start II" position to the "run" position, the energization of the motor field windings is unchanged, but the field excitation of the port generator is reduced from 200% to normalcy by connecting the said field windings across the positive and the neutral supply conductors 296 and 295, respectively. The circuit for energizing the port generator field winding 22 at normal excitation is the same as that hereinbefore traced. Also, the transition of changing the port generator field excitation from 200% to normalcy is the same as that hereinbefore explained.

When the port field lever is actuated to the "full" position, the V-shaped notch 221 registers with the upper end of the transversely disposed bar 219 and allows the operator to actuate the port speed lever to any desirable operating position.

In case it is desirable to operate both of the motors from the starboard generator, the movement of the levers is substantially the same as the movement of the levers when operating both of the motors from the port generator, just previously described, except that the starboard field lever and the starboard speed lever are moved instead of the port field lever and the port speed lever, and that the motor-generator selective switch is actuated to the starboard position. When both of the motors are being operated from the starboard generator, the motor field winding and the starboard generator field winding are controlled exclusively by the starboard field switch 142, excluding the port field switch 122 from the circuits.

When the starboard generator field lever is in the "off" position, the starboard motor field winding 32 and the starboard generator field 12 are closed circuited in the same manner as they were when the starboard motor was connected only to the starboard generator. However, for the purpose of effecting subsequent circuit connections the port motor field winding 38 is closed-circuited through a different path than previously traced when the port motor was connected directly to the port generator only. The closed-circuit for the port motor field winding 38 may be traced from one terminal thereof through the ammeter 271, conductors 272 and 326, the contact fingers 188 and 187 bridged by the contact segment 170, conductors 316 and 266, the set of contact fingers 149 bridged by the contact segment 144, conductor 267, the contact fingers 182 and 184 bridged by the contact segment 168, conductor 275, the discharge resistor 276, and a conductor 270 to the opposite terminal of the port motor field winding 38.

When the starboard field lever is moved to the "start I" position, the motor field windings still remain closed-circuited, but the starboard generator field winding 12 is connected across the positive and negative supply conductors 296 and 294, thus energizing them at 200% excitation and causing the starboard generator to deliver a relatively high voltage to meet the demands of the motors when operating as straight induction motors. It will also be observed that just as soon as the starboard field lever is moved out of the "off" position, the upper end of the transversely disposed bar 213 rides on the under surface of the horizontally disposed bar 198. The bar 213, together with the pivotally mounted block 210, constrains the lower end of the transversely disposed bar 214 to positively engage either the V-shaped notch 246 or 247, depending, however, whether the port direction lever is in the "astern" or the "ahead" position. When the starboard field lever is moved out of the "off" position, the starboard direction lever is also locked in either the "astern" or the "ahead" position by the lower end of the bar 218 engaging either the V-shaped notch 239 or 237.

In the "start II" position, the port generator field winding 12 remains at 200% excitation for delivering a relatively high voltage for pulling the motors into synchronism. Also, in "start II" position, the closed-circuited motor field windings are interrupted, and, at the same time, are energized from the positive and the negative supply conductors 296 and 294, thus causing the motors to act as synchronous motors. The circuit for energizing the starboard motor field winding may be traced from the positive supply conductors 296 through a conductor 297, the contact fingers 157 and 155 bridged by the contact segment 148, a conductor 310, the power factor correction resistor 355, a conductor 313, the starboard motor field rheostat 249, the knife switch 314, conductors 315 and 263, the starboard motor field winding 32, the ammeter 264, conductors 265 and 316, contact fingers 187 and 186 bridged by the contact segment 170, conductor 317, the set of contact fingers 150 bridged by the contact segment 145, and a conductor 318 to the negative supply conductor 294.

The circuit for energizing the port motor field winding 36 may be traced from the positive supply conductor 296 through a conductor 297, the set of contact fingers 157 and 155 bridged by the contact segment 148, conductors 310 and 311, the contact fingers 179 and 180 bridged by the contact segment 165, conductors 321 and 356, the power factor correction resistor 357, conductor 323, the port motor field rheostat 251, the knife switch 324, conductors 325 and 270, the port motor field winding 38, the ammeter 271, conductors 272 and 326, the contact fingers 188 and 186 bridged by the contact segment 170, conductor 317, the set of contact fingers 150 bridged by the contact segment 145, and a conductor 318 to the negative supply conductor 294.

As observed from the motor field windings just traced, the power factor correction rheostat 355 is connected in circuit with the starboard motor field winding 32 and the power factor correction 357 is connected in circuit with the port motor field winding 38. As hereinbefore explained, the inclusion of the power factor correction resistors 355 and 357 are for the purpose of decreasing the excitation of the motor field windings to prevent the motors from drawing a leading current from the starboard generator. In this manner, the motors and the starboard generator are operated at their maximum efficiency. When the starboard field lever is moved to the "run" position, the energization of the motor field windings remain unchanged, but the excitation of the starboard generator field winding 12 is reduced from 200% to normalcy by connecting the said field winding across the neutral and negative supply conductors 295 and 294, respectively.

The transition circuits effected for decreasing the excitation of the starboard generator from 200% to normalcy are the same as those previously traced when the starboard generator was operating to deliver current to the starboard motor only.

As will be observed, by the combination of the motor-generator selective switch and the direction switches, the starboard generator only may be connected in circuit with the port motor only, and, conversely, the port generator only may be connected in circuit with the starboard motor only. The starboard generator only is connected in circuit with the port motor only when the motor-generator selective switch 44 is in the "starboard" position, the starboard direction switch is in the "off" position and the port direction switch is in either the "astern" or "ahead" position. Similarly, the port generator only is connected in circuit with the starboard motor only when the motor-generator selective switch 44 is in the "port" position, the port direction switch is in the "off" position and the starboard direction switch is in either the "astern" or "ahead" position. In practice, the operation of the starboard generator only with the port motor only, and the port generator only with the starboard motor only, is rather infrequent, usually being done in case of necessity in making repairs upon either one of the two motors or upon either one of the two generators. However, in case it became necessary to operate the motors and generators as such, I provide a knife switch 214 to interrupt the excitation of the starboard motor field winding when the starboard motor generator only is delivering current to the port motor only, and a knife switch 324 for interrupting the port motor field winding when the port generator only is delivering current to the starboard motor only.

In actual practice, to prevent arcing of the engaging parts of the knife switches, it is preferable to open the knife switch that corresponds to the motor which is to be made inactive, before actuating the levers for operating the selective generator and the selective motor.

I have disclosed a control circuit which provides for selectively connecting any number of a plurality of synchronous motors in circuit relation with any number of a plurality of generators, at the same time for maintaining unity power factor in the connections between the selected motors and generators, together with an interlocking provision which insures that the proper electrical connections are effected.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. A control system comprising, in combination, a plurality of alternating current generators, a plurality of synchronous motors for driving a load, means for selectively connecting any one of the motors in circuit relation with any one of the generators, means for driving each generator, means for varying the speed of each generator driving means, thereby varying the speed and the load of the selected motor that may be connected in circuit relation with the selected generator by the selective connecting means, a field winding for each generator and each motor, means for energizing only the field winding of the selected generator and of the selected motor, and means for so energizing the said selected field windings as to maintain the current delivered to, and the voltage impressed upon, the selected motor substantially in phase with each other for all speeds and load conditions of the selected motor.

2. A control system comprising, in combination, a plurality of alternating current generators, a plurality of synchronous motors for driving a load, means for selectively connecting any number of motors in circuit relation with any one of the generators, means for driving each generator, means for varying the speed of each generator driving means, thereby varying the speed and the load of the selected motors that may be connected in circuit relation with the selected generator by the selective connecting means, a field winding for each generator and each motor, means for energizing only the field winding of the selected generator and of each of the selected motors, and means for so energizing the said selected field windings as to maintain the current delivered to, and the voltage impressed upon, the selected motors substantially in phase with each other for all speeds and load conditions of the selected motors.

3. A control system comprising, in combination, an alternating current generator and a synchronous motor, a second alternating current generator and a second synchronous motor, a motor-generator selective means, which, when in one position, provides for connecting the first-mentioned motor in circuit relation with the first-mentioned generator and the second-mentioned motor in circuit with the second-mentioned generator, and, when in a second position, for connecting both of the motors in circuit relation with the first-mentioned generator only, and when in a third position, for connecting both of the motors in circuit relation with the second-mentioned generator only, means for actuating the motor-generator selective means to any one of the three operating positions, means for driving each generator, means for varying the speed of each generator driving means, thereby varying the speed and load of the motors, a field winding for each generator and each motor, means for selectively energizing the said field windings in accordance with the requirements that may be called for by the motor-generator selective means, and means for so energizing the said selected field windings as to maintain the current delivered to, and the voltage impressed upon, the motors substantially in phase with each other for all connections effected by the motor-generator selective means.

4. A control system comprising, in combination, an alternating current generator and a synchronous motor, a second alternating current generator and a second synchronous motor, a motor-generator selective means, which, when in one position, provides for connecting the first-mentioned motor in circuit relation with the first-mentioned generator and the second-mentioned motor in circuit with the second-mentioned generator, and, when in a second position, for connecting both of the motors in circuit relation with the first-mentioned generator only, and when in a third position, for connecting both of the motors in circuit relation with the second-mentioned generator only, means for actuating the motor-generator selective means to any one of the three operating positions, reversing means interposed between the first-mentioned motor and the motor-generator selective means for reversing the polarity of the voltage impressed upon the first-mentioned motor, said reversing means also having a third position for deenergizing the first-mentioned motor, means for actuating the said reversing means, a second reversing means interposed between the second-mentioned motor and the motor-generator selective means for reversing the polarity of the voltage impressed upon the second-mentioned motor, said second-mentioned reversing means also having a third position for deenergizing the second-mentioned motor, means for actuating the second-mentioned reversing means, and means for interlocking the motor-generator selective means and the two reversing means that both of the reversing means must be in the position for deenergizing the motors before the motor-generator selective means can be actuated.

5. A control system comprising, in combination, a port and a starboard alternating current generator, a port and a starboard synchronous motor, a motor-generator selective means, which, when in one position, provides for connecting the port motor in circuit relation with the port generator and the starboard motor in circuit with the starboard generator, and, when in a second position for connecting both the motors in circuit relation with the port generator only, and, when in a third position, for connecting both of the motors in circuit relation with the starboard generator only, port motor reversing means interposed between the port motor and the motor-generator selective means for reversing the phase sequence of the voltage impressed upon the port motor, said reversing means also having a third position for deenergizing the port motor, means for actuating the port motor reversing means, a starboard motor reversing means interposed between the starboard motor and the motor-generator selective means for reversing the phase sequence of the voltage impressed upon the starboard motor, said starboard motor reversing means also having a third position for deenergizing the starboard motor, means for actuating the starboard motor reversing means, a source of electrical energy, a field winding for each generator and each motor, a field selective means comprising three parts for connecting such of the said field windings in circuit with said source of energy as to meet the requirements that may be called for by the motor-generator selective means, means for actuating one of the parts of the field selective means in accordance with the movements of the motor-generator selective means, and individual means for actuating each of the other two parts of the field selective means.

6. A control system comprising, in combination, a port and a starboard alternating current generator, a port and a starboard synchronous motor, a motor-generator selective means, which, when in one position, provides for connecting the port motor in circuit relation with the port generator and the starboard motor in circuit with the starboard generator, and when in a second position for connecting both the motors in circuit relation with the port generator only, and, when in a third position, for connecting both of the motors in circuit relation with the starboard generator only, port motor reversing means interposed between the port motor and the motor-generator selective means for reversing the phase sequence of the voltage impressed upon the port motor, said reversing means also having a third position for deenergizing the port motor, means for actuating the port reversing means, a starboard motor reversing means interposed between the starboard motor and the motor-generator selective means for reversing the phase sequence of the voltage impressed upon the starboard motor, said starboard motor reversing means also having a third position for deenergizing the starboard motor, means for actuating the starboard reversing means, a source of electrical energy, a field winding for each generator and each motor, a field selective means comprising three parts for connecting such of the said field windings in circuit with said source of energy as to meet the requirements that may be called for by the motor-generator selective means, means for actuating one of the parts of the field selective means in accordance with the movements of the motor-generator selective means, and individual means for actuating each of the other two parts of the field selective means, means for so interlocking each of the individual field actuating means with the motor-generator selective means and the port and starboard reversing means that both the motor-generator selective means and the two reversing means must be in one of their respective operating positions before the individual field actuating means can be actuated to move their respective part of the field selective means for connecting the selected field windings in circuit with the source of electrical energy, means for driving the port and the starboard generators, means for varying the speed of each of the driving means, thereby varying the speed and load of the motors, and means for insuring that the speed is reduced to a predetermined minimum value before the individual field actuating means can be actuated.

7. A control system comprising, in combination, a port and a starboard alternating current generator, a port and a starboard synchronous motor, a motor generator selective means, which, when in one position, provides for connecting the port motor in circuit relation with the port generator and the starboard motor in circuit with the starboard generator, and when in a second position for connecting both the motors in circuit relation with the port generator only, and, when in a third position, for connecting both of the motors in circuit relation with the starboard generator only, port reversing means interposed between the port motor and the motor-generator selective means for reversing the phase sequence of the voltage impressed upon the port motor, said reversing means also having a third position for deenergizing the port motor, means for actuating the port reversing means, a starboard reversing means interposed between the starboard motor and the motor-generator selective means for reversing the phase sequence of the voltage impressed upon the starboard motor, said starboard reversing means also having a third position for deenergizing the starboard motor, means for actuating the starboard reversing means, a source of electrical energy, a field winding for each generator and each motor, a field selective means comprising three parts for connecting such of the said field windings in circuit with said source of energy as to meet the requirements that may be called for by the motor-generator selective means, means for actuating one of the parts of the field selective means in accordance with the movements of the motor-generator selective means, and individual means for actuating each of the other two parts of the field selective means, means for so interlocking each of the individual field actuating means with the motor-generator selective means and the port and starboard reversing means that both the motor-generator selective means and the two reversing means must be in one of their respective operating positions before the individual field means can be actuated to move their respective part of the field selective means for connecting the selected field windings in circuit with the source of electrical energy, means for driving the port and the starboard generators, means for varying the speed of each of the driving means, thereby varying the speed and load of the motors, and means for insuring that the speed is reduced to a predetermined minimum value before the individual field means can be actuated, and means for so energizing the said selected field windings as to maintain the current delivered to, and the voltage impressed upon, the motor substantially in phase with each other for all connections effected by the motor-generator selective means.

8. A control system comprising, in combination, a generator, a motor, means for connecting the motor and the generator in circuit relation, a field winding for the generator and the motor, a source of electrical energy, means for energizing the field windings from said source of energy, means for so interlocking the means for connecting the generator and the motor in circuit relation and the means for so energizing the field windings that the generator and the motor must be connected in circuit relation before the field windings can be energized.

9. A control system comprising, in combination, a generator, a motor, means for connecting the motor and the generator in circuit relation, a field winding for the generator and the motor, a source of electrical energy, means for energizing the field windings from said source of energy, means for so interlocking the means for connecting the generator and the motor in circuit relation and the means for energizing the field windings that the generator and the motor must be connected in circuit relation before the field windings can be energized, means for driving the generator, means for varying the speed of the generator driving means, means for insuring that the speed is reduced to a predetermined minimum value before the field windings can be energized.

10. A control system comprising, in combination, a plurality of alternating current generators, a plurality of synchronous motors for driving a load, a motor-generator means for selectively connecting any one or all of the motors in circuit relation with any one of the generators, a field winding for each generator and each motor, a source of electrical energy, means for selectively energizing such of the field windings from said source of energy as to meet the requirements that are called for by motor-generator selective means, means for so interlocking the motor-generator selective means and the field selective means that the circuit relations effected by the motor-generator selective means must be completed before the selected field winding can be energized, means for so energizing the said selected field windings as to maintain the current traversing, and the voltage of, the motor-generator selective means substantially in phase with each other for all connections effected by the motor-generator selective means.

11. A control system comprising, in combination, a plurality of alternating current generators, a plurality of synchronous motors for driving a load, a motor-generator means for selectively connecting any one or all of the motors in circuit relation with any one of the generators, a field winding for each generator and each motor, a source of electrical energy, means for selectively energizing such of the field windings from said source of energy as to meet the requirements that may be called for by motor-generator selective means, means for so interlocking the motor-generator selective means and the field selective means that the circuit relations effected by the motor-generator selective means must be completed before the selected field winding can be energized, means for so energizing the said selected field windings as to maintain the current traversing, and the voltage of, the motor-generator selective means substantially in phase with each other for all connections effected by the motor-generator selective means, means for driving the generators, means for varying the speed of the selected generator driving means, means for insuring that the speed is reduced to a predetermined minimum value before the field windings can be energized.

WALTER SCHAELCHLIN.